United States Patent [19]

Zahner

[11] 4,067,925

[45] Jan. 10, 1978

[54] ELECTRIC INSULATOR

[75] Inventor: Hansruedi Zahner, Oberentfelden, Switzerland

[73] Assignee: Sprecher & Schuh AG, Aarau, Switzerland

[21] Appl. No.: 695,086

[22] Filed: June 11, 1976

[30] Foreign Application Priority Data

Jan. 20, 1976   Switzerland ............................ 609/76

[51] Int. Cl.² ............................................. C08L 63/00
[52] U.S. Cl. ...................... 260/830 TW; 260/824 EP; 260/824 R; 260/826; 260/830 P; 260/831; 260/834; 260/835; 260/839; 260/842; 260/849; 260/850
[58] Field of Search ....... 260/835, 859, 834, 830 TW, 260/831

[56] References Cited

U.S. PATENT DOCUMENTS

| 3,470,266 | 9/1969 | Batzer | 260/834 |
| 3,546,064 | 12/1970 | Hamilton | 260/835 |
| 3,792,011 | 2/1974 | Smith | 260/830 TW |
| 3,819,845 | 6/1974 | Tahiliani | 174/28 |
| 3,843,615 | 10/1974 | Herwig | 260/835 |
| 3,868,431 | 2/1975 | Hutchinson | 260/859 |
| 3,886,229 | 5/1975 | Hutchinson | 260/859 |
| 3,936,557 | 2/1976 | Watt | 260/830 TW |
| 3,944,716 | 3/1976 | Katzbeck | 174/28 |
| 3,962,368 | 6/1976 | Herwig | 260/835 |

Primary Examiner—Paul Lieberman
Attorney, Agent, or Firm—Ostrolenk, Faber, Gerb & Soffen

[57] ABSTRACT

Electric insulators are prepared from a mixture of a curable carrier reaction resin, a hardener for the carrier reaction resin and a filler which is a ground, hardened filler reaction resin. The insulators are advantageously used in electric devices containing an electronegative gas.

3 Claims, 1 Drawing Figure

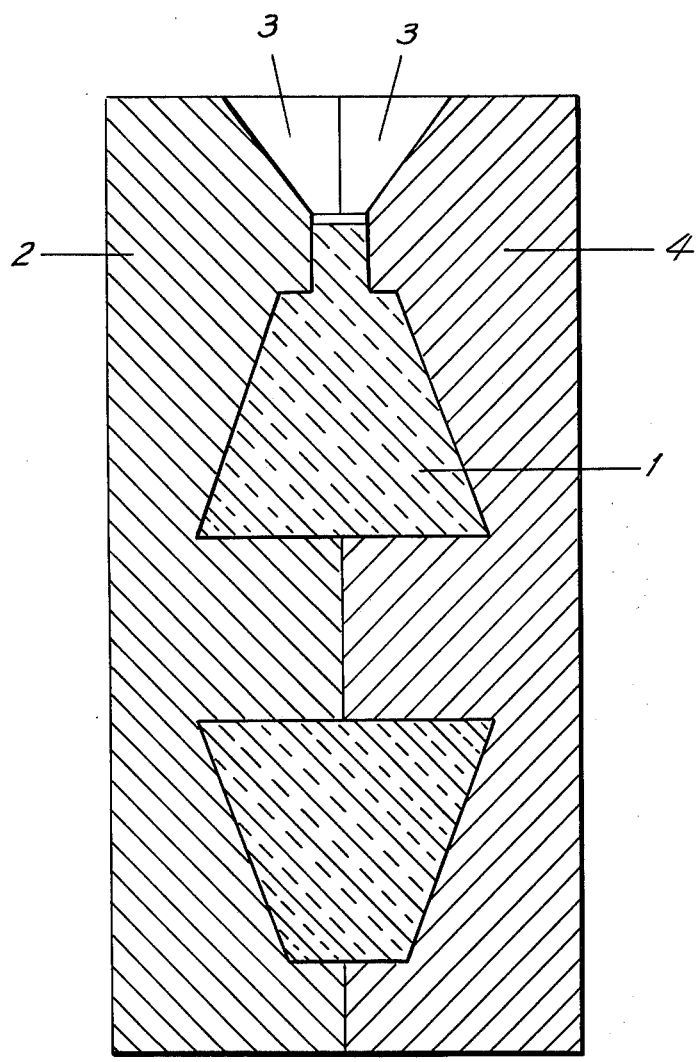

ELECTRIC INSULATOR

BACKGROUND OF THE INVENTION

The present invention relates to an electric insulator for the interior of an encapsulated electric device in which electric discharges and/or arcs occur at least at times and which is filled with an electronegative gas, said insulator comprising at least one carrier reaction resin hardenable by polymerization and at least one filler.

It is known to produce such electric insulators for electric devices using a casing resin with a filler capable of resisting not only the decomposition products of the electronegative gas which form due to electric discharges and/or arcs but also the compounds which form due to the reaction of said decomposition products with other chemical elements contained in the encapsulation. The most preferred filler for such casting resin insulators is aluminum oxide, particuarly in the form of molten corundum. A disadvantage of these insulators made of hardened casting resin and molten corundum is that, relative to the carrier resin, the filler is so heavy that sedimentation problems are encountered in production, and the final insulators are relatively heavy. The hardened insulators always require finishing, an operation which can only be performed with expensive diamond tools. Another disadvantage is that, for economic reasons, corundum cannot be used in chemically pure form, and the impurities of the corundum have a detrimental effect on the electrical strength of the insulators.

Insulators produced of pure resin without filler have the disadvantage of shrinking too much while making it impossible to produce castings which are true to shape.

It is an object of the invention to provide an electric insulator which is light in weight, easy to machine, contains no fillers with impurities, and shrinks less than the carrier resin. This and other objects of the invention will become apparent to those skilled in the art from the following description and the sole FIGURE shows a section of a mold for producing the insulators.

DESCRIPTION OF THE PREFERRED EMBODIMENTS

The objects of the invention are achieved by producing the insulator using a mixture of at least one carrier reaction resin to be hardened by polymerization, at least one hardener and at least one filler reaction resin which has already been hardened by polymerization and finely ground.

The carrier reaction resin to be hardened and the already hardened, finely ground filler reaction resin, which may or may not be of the same type, can be an epoxy resin, unsaturated polyester resin, silicone resin, polyurethane resin, phenolic resin, or melamine resin.

The filler resin is used in the greatest amount practical, which is general, can be up to about 150 parts per hundred carrier resin. The hardener is usually employed in an amount of about 0.1 to 110 parts per hundred carrier resin. It is advantageous for the already hardened, finely ground filler reaction resin to have a grain size not exceeding 0.5 mm.

The FIGURE shows a section of a mold for producing disc-shaped insulators filled with a casting compound 1. The mold is a split mold and has two halves 2, 4 with pour holes 3. Perpendicular to the drawing plane, the cavity is of annular design. The washer-shaped electric insulators produced in this mold are used to support, in a metal-encapsulated apparatus filled with sulfur hexafluoride insulating gas, the inner conductor coaxially disposed in a cylindrical encapsulation. In such an apparatus, chemical resistivity of the insulator surface against the decomposition products of the sulfur hexafluoride insulating gas which form in the arc due to thermal dissociation is indispensable.

A disc-shaped insulator was produced by casting. The composition of the casting compound was as follows:

100 parts cycloaliphatic epoxy resin as carrier reaction resin 80 parts hexahydrophthalic acid anhydride as hardener 70 parts hardened, finely ground bisphenol A type epoxy resin without additives or fillers and having a grain size of 0.2 mm as filler reaction resin.

The cycloaliphatic resin and the hardener were mixed thoroughly at 70° C, and then the hardened, finely ground, bisphenol A type resin was added and the resulting mixture was stirred for 15 minutes at a pressure of 0.1 Torr and a temperature of 70° C. The casting compound was poured under vacuum (10 Torr) at 90° C into the preheated mold 2, 4. Gelling took place at 90° C during 6 hours and hardening at 140° C during 10 hours.

The following measurements were taken on the 10 × 15 + 120 mm test specimens cast at the same time:

Tensile strength (DIN 53 455): 535 kp/cm$^2$

Bending strength (DIN 53 452): 870 kp/cm$^2$

Deflection (DIN 53 452): 5.4 mm

Impact strength (DIN 53 453): 15.0 kpcm/cm$^2$

Martens temperature (DIN 53 458): 100.0° C

Arc resistance (ASTM-D-495): 123–125 sec.

Density (DIN 53 479): 1.21 g/cm$^3$

Linear shrinkage: 0.6 %

The hardened, disc-shaped insulator is opaquely translucent, making optical inspection of impurities or gas inclusions very easy.

In this example, the carrier reaction resin was a cycloaliphatic epoxy resin. This resin could also be an epoxy resin of the Bisphenol A or F type, or a diglycidyl ester type resin, or an heterocyclic epoxy resin, or any other epoxy resin. Unsaturated polyester resins, silicone resins, polyurethane resins, phenolic resins and melamine resins are also suitable.

The filler reaction resins can be of the same type as the carrier reaction resin employed, or any other type listed among the carrier reaction resins. It is also possible to use several resin types as filler reaction resin and as carrier reaction resin at the same time. When the filler and carrier reaction resins belong to the same type, it is possible to produce transparent insulators which are even easier to inspect optically than the translucent ones.

Particular advantages of the invention are that all scrap and waste, including that from other thermosetting plastic production lines, can be used as the finely ground filler reaction resin. In addition, optical inspection of the translucent or transparent insulators for internal impurities or gas inclusions is very easy. Therefore, expensive test instruments and inspection time can be saved.

The method described makes it possible to cast insulators of "pure resin" without impermissible internal tensions. The "pure resin" insulator can be used to advantage in sulfur hexafluoride gas insulated apparatus because the surface of such insulators possesses the chemical resistance required.

Various changes and modifications can be made in the process and product of this invention without departing from the spirit and scope thereof. The embodiments described herein were intended to be ilustrative only and were not intended to limit the invention.

What is claimed is:

1. An electric insulator adapted for use in the interior of an encapsulated electric device in which electric discharges or arcs or both occur at least at times and which is filled with an electronegative gas, said insulator comprising the polymerization hardened product of a mixture consisting essentially of a polymerization hardenable cycloaliphatic epoxy resin, a hexahydrophthalic acid anhydride hardener and a filler, wherein said filler is a finely divided, ground, cured bisphenol A epoxy resin in an amount up to 150 parts per 100 parts of said cycloaliphatic epoxy resin.

2. The insulator of claim 1 wherein said filler has a grain size not exceeding 0.5 mm.

3. In an electric device filler with an electronegative gas and containing at least one insulator therein, the improvement which comprises employing the insulator of claim 1 as said insulator.

* * * * *